Jan. 15, 1952 W. W. BEMAN ET AL 2,582,814
TRANSONIC WIND TUNNEL
Filed July 31, 1947
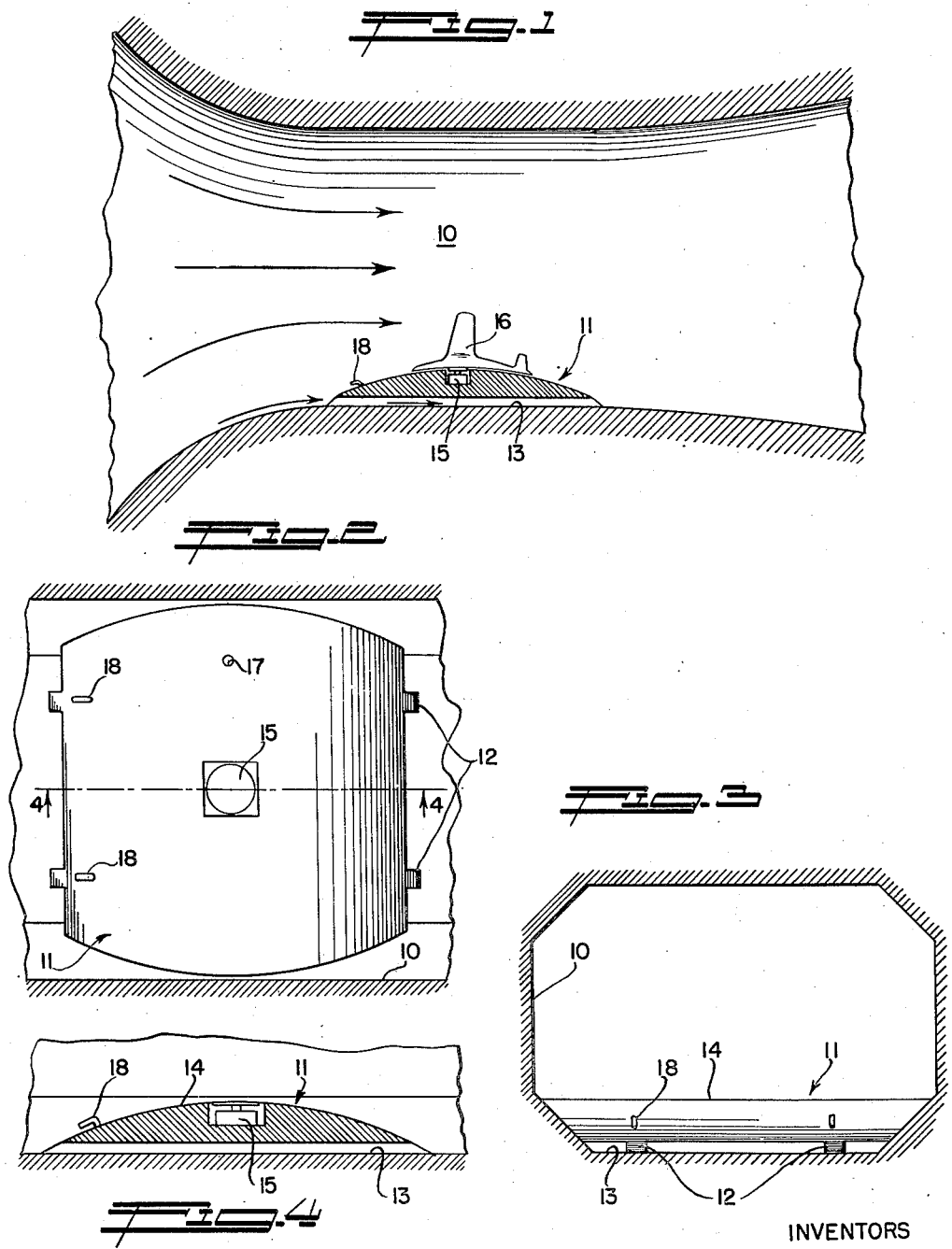
INVENTORS
WARD W. BEMAN
JOHN H. WEAVER
By George Sullivan
Agent Patented Jan. 15, 1952

2,582,814

UNITED STATES PATENT OFFICE 2,582,814

TRANSONIC WIND TUNNEL

Ward W. Beman, Glendale, and John H. Weaver, Burbank, Calif., assignors to Lockheed Aircraft Corporation, Burbank, Calif.

Application July 31, 1947, Serial No. 765,184

3 Claims. (Cl. 73—147)

This invention relates to apparatus applicable to existing subsonic wind tunnels to permit wind tunnel tests of models and the like through the transonic speed range.

It is known that relatively abrupt changes in the air flow over airfoils occur during the approach to transonic speed ranges and that a so-called compressibility or standing shock wave is created at such speeds. In wind tunnels as heretofore built, it has been impossible to carry model tests through the transonic speed range, and it has therefore been necessary to mount models on airplanes which are then dived through the critical speed range in an effort to record instrument test readings at such speeds. In addition to the uncertainty, expense and danger of such test methods, the delicate measuring instruments required to record the test results were affected by the vibrations of the airplane itself which was itself affected by the shock waves created at such subsonic or transonic air speeds.

It is accordingly an object of this invention to provide apparatus for converting existing subsonic wind tunnels into transonic and supersonic tunnels by installing a curved airfoil surface in the throat of the existing tunnel to produce uniform airflow accelerations capable of smooth variations between sub-sonic and supersonic velocities by changing the tunnel velocity.

It is also an object of this invention to provide an arrangement of the type described wherein the tunnel wall boundary layer is bypassed around the curved surface, thus permitting the mounting of models or half models close to such surface without introducing undesirable flow gradients over the area of the model.

Other objects and features of the invention will be readily understood from the following detailed description of typical preferred forms of the invention wherein reference will be made to the accompanying drawings in which:

Figure 1 is a fragmentary section through the throat or test section of a conventional wind tunnel showing the device of this invention installed therein, with a half model in position thereon;

Figure 2 is a plan view of the device of this invention as installed on the floor of the tunnel test section;

Figure 3 is an end view of the device of this invention as positioned in the tunnel; and Figure 4 is a section on the line 4—4 of Figure 2.

A conventional wind tunnel is provided with a test section or throat 10 of reduced area relative to the balance of the tunnel (not shown) which may be of the closed recirculating or open type. The reduced section accelerates the flow of air through the throat (but practical limitations prevent sufficient restriction to approach sonic speeds with a model in place therein except at a prohibitive increase in power consumption).

In order to provide a local velocity in the transonic and supersonic speed ranges, we provide an arcuately shaped insert 11 spaced from the floor of the tunnel, as by members 12, to provide an escape slot or bypass 13 for the boundary layer of air along the floor of the tunnel.

We have found that a substantially arcuate top surface 14 for the insert 11 gives a sufficiently uniform acceleration of air flow over the surface to give good results over the range of Mach numbers from .50 to 1.1 where the maximum flow in the tunnel throat would otherwise be below such Mach numbers. These results were obtained with an insert 19 inches high in the 8½ by 12 foot tunnel throat of the Southern California Cooperative Wind Tunnel in Pasadena where the highest Mach number otherwise attainable was 1.0 with no model. The presence of a practical sized model in the tunnel throat reduces the working Mach number by 10 to 20 points.

A balance assembly 15 is installed in the approximate center of the top surface 14 of the insert 11, on which a half span or other type of model 16 may be mounted for the usual measurements of airforces on the model. A static reference orifice 17 is brought to the surface 14 of the insert 11, and one or more total head reference tubes 18 project near the upstream edge.

In the operation of a wind tunnel incorporating the disclosed apparatus it has been found that a substantially arcuate top surface for the insert provides a properly faired contour that will give an accelerated velocity field around the model 16 which is sufficiently uniform, as demonstrated by chordwise and spanwise rakes, to give accurately calibrated speeds over the transonic velocity range. The apparatus of this invention has been found to produce velocity accelerations of 25% and more.

Having described only typical forms of the invention we do not wish to be limited to the specific details herein set forth, but wish to reserve to ourselves any variations or modifications that may appear to those skilled in the art and fall within the scope of the following claims.

We claim as our invention:

1. In combination with a wind tunnel for testing airplane and airfoil models at various air flow velocities, an insert therein spanning the throat of said tunnel and having an aerodynamically faired curved top surface and a bottom surface spaced from the wall of said tunnel, said insert being so arranged as to produce an accelerated air flow thereover free from tunnel wall boundary layer effects, and a balance system carried by said insert for supporting and measuring the aerodynamic forces acting on a model positioned thereon.

2. In combination with a wind tunnel having a Venturi throat wherein airplane models and airfoils are to be mounted for testing at subsonic airflow velocities, a spanwise partial obstruction member conforming on one surface to a spanwise segment of the tunnel throat, the exposed surface of said member having an arcuate chordwise form of such contour as to produce a locally accelerated airflow thereover of a sufficient depth and uniformity to test said models and airfoils when mounted adjacent the exposed surface of said member, and means for supporting said member in spaced relationship to the adjacent surface of the throat of said tunnel whereby to provide a bypass for the boundary layer of air flowing along such surface.

3. In combination with a wind tunnel for testing airplane and airfoil models at various air flow velocities, an insert therein spanning the throat of said tunnel and having an aerodynamically faired curved top surface and a bottom surface spaced from the wall of said tunnel, said insert being so arranged as to produce an accelerated air flow thereover free from tunnel wall boundary layer effects, and balance system means for supporting and measuring the aerodynamic forces acting on a model superimposed above the top surface of said insert.

WARD W. BEMAN.
JOHN H. WEAVER.

REFERENCES CITED

The following references are of record in the file of this patent:

UNITED STATES PATENTS

| Number | Name | Date |
|---|---|---|
| 1,706,145 | Collins | Mar. 19, 1929 |
| 2,041,786 | Stalker | May 26, 1931 |
| 2,078,854 | Jones | Apr. 27, 1937 |
| 2,486,287 | Jackson | Oct. 25, 1949 |

FOREIGN PATENTS

| Number | Country | Date |
|---|---|---|
| 579,758 | Great Britain | Aug. 14, 1946 |